United States Patent [19]
Firey

[11] Patent Number: 5,613,626
[45] Date of Patent: Mar. 25, 1997

[54] SOLIDS TRANSFER MECHANISM

[76] Inventor: Joseph C. Firey, P.O. Box 15514, Seattle, Wash. 98115

[21] Appl. No.: 441,390

[22] Filed: May 15, 1995

[51] Int. Cl.[6] .................................................. G01F 11/00
[52] U.S. Cl. ........................ 222/217; 222/1; 222/334
[58] Field of Search ............................. 222/1, 216, 217, 222/218, 334, 361, 380

[56] References Cited

U.S. PATENT DOCUMENTS

| | | | |
|---|---|---|---|
| 1,675,741 | 7/1928 | Waring | 222/217 |
| 1,789,051 | 1/1931 | Opitz | 222/216 |
| 2,761,588 | 9/1956 | Shields | 222/361 X |
| 3,285,669 | 11/1966 | Clark | 222/216 X |
| 4,733,803 | 3/1988 | Sisson et al. | 222/361 X |
| 4,737,062 | 4/1988 | Mathewes | 222/361 X |
| 5,172,835 | 12/1992 | Hudcovic et al. | 222/380 |
| 5,409,137 | 4/1995 | Bonomelli | 222/217 X |

FOREIGN PATENT DOCUMENTS 2455269  12/1980  France ................................ 222/217

*Primary Examiner*—Kevin P. Shaver

[57] ABSTRACT

A solids transfer mechanism is described for transferring solid chunks from a sealed chamber to a receiver. The solid chunks are transferred from a sealed cavity into a larger volume dump cavity from which they are dumped into a receiver. By use of a larger volume for the dump cavity, contact between the seals and the solid chunks is minimized, since the chunks are loose inside the larger volume dump cavity.

8 Claims, 5 Drawing Sheets

5,613,626

SOLIDS TRANSFER MECHANISM

CROSS REFERENCES TO RELATED APPLICATIONS

The solid transfer mechanisms of this invention are particularly well suited for use with cyclic char burning engines, such as those described in my earlier filed U.S. patent application entitled, *Combined Reactor For Cyclic Char Burning Engines,* Ser. No. 08/379914, filed 30 Jan. 1995, wherein ceramic chips are admixed with the char fuel and must be removed periodically from the reactor.

BACKGROUND OF THE INVENTION

1. Field of the Invention

This invention is in the field of mechanisms for moving solid materials, and particularly for moving solid materials into or out of reaction chambers operating at high pressures such as the primary reactors for cyclic char burning engines.

2. Description of the Prior Art

Examples of prior art mechanisms for moving solid materials into or out of reaction chambers operating at high pressures are described in the following references:

a. "Fuel Gasification", Advances in Chemistry Series 69, American Chemical Society, Washington, D.C., 1967; Page 33, FIG. 1; Page 59, FIG. 5; Page 107, FIG. 2;

b. "Gas Engines and Producers", L. S. Marks and H. S. McDewell, American Technical Society, Chicago, 1919; Part II; Page 18, FIG. 8; Page 40, FIG. 27;

c. U.S. Pat. No. 4,412,511; Firey, Nov. 1, 1983; FIGS. 1, 2, 3, 7, 10, 13, 14, 16, d. U.S. Pat. No. 4,455,837; Firey, Jun. 26, 1984; FIGS. 3, 8, 9, 15, e. U.S. Pat. No. 4,584,970; Firey, Apr. 29, 1986; FIGS. 2, 3, 4, 5, 6, 7, 13, f. U.S. Pat. No. 4,653,436; Firey, Mar. 31, 1987; FIGS. 1, 2, 4, 5, Of the various prior art mechanisms described in these and other references, all transfer the solid material into or out of the high pressure reaction chamber in a single transfer step, wherein the solids being transferred necessarily slide across the seals for sealing the chamber. When abrasive solids are thusly transferred, this sliding wears away the seals and, in consequence, frequent and costly replacement of seals is necessary. These seal wear problems are aggravated in those cyclic char burning engines, and cyclic velox boilers, which use additions of ceramic chips and basic ceramics to the char fuel for the purposes of improving the char fuel reactions with air and for reducing emissions of acid rain components. It would be beneficial to have available a solids transfer mechanism which minimized or avoided the sliding of solid materials across the seals.

SUMMARY OF THE INVENTION

The solid transfer mechanisms of this invention comprise a transfer plate whose transfer cavity, holding solid materials, is moved from the solids source into alignment with a transfer piston. The transfer piston moves the solids out of the transfer cavity into a dump cavity of larger volume within a dump plate. The dump plate then moves the dump cavity into alignment with a dump piston which forces the solids out of the dump cavity into a receiver. In this way the solids are transferred from a source into a receiver. The larger dump cavity volume reduces or eliminates abrasive rubbing of solids over the seals. In this way solids can be sealably transferred from a high pressure source into a low pressure receiver without damaging the seals, and this is a principal beneficial object of this invention.

The solid transfer mechanisms of this invention are particularly well suited for use as ash removal mechanisms on cyclic char burning engines, such as are described in U.S. Pat. No. 4,412,511. Ashes from the burning of char fuels are abrasive materials and tend to wear seals needed to keep the char fuel reactor operating at cyclically high pressures. Where ceramic chips, such as basic limestone are also used in order to reduce engine exhaust emissions, the ash will additionally contain these abrasive chips whose removal would additionally wear the seals. By using the solid transfer mechanisms of this invention as ash removal apparatus, wear of seals can be reduced or eliminated.

BRIEF DESCRIPTION OF THE DRAWINGS

An example form of the invention is shown in cross sectional views of FIG. 1A and 1B, as set for dumping of solids into a receiver. This form of the invention is shown in cross sectional views of FIGS. 2A and 2B, as set for transfer of solids into a dump cavity.

A modified form of dump cavity is shown in FIG. 3 utilizing a hinged bottom plate on the dump cavity.

DESCRIPTION OF THE PREFERRED EMBODIMENTS

One preferred example of a solids transfer mechanism of this invention is shown in FIGS. 1A, 1B, 2A, and 2B, and comprises the following elements:

1. A fixed source plate, 1, comprises a source port, 2, through which chunks of solid material, such as ceramic chips and ashes, pass from a source, 3, such as a cyclic char burning engine primary reactor, which is operating at high pressures.

Figure 1A:
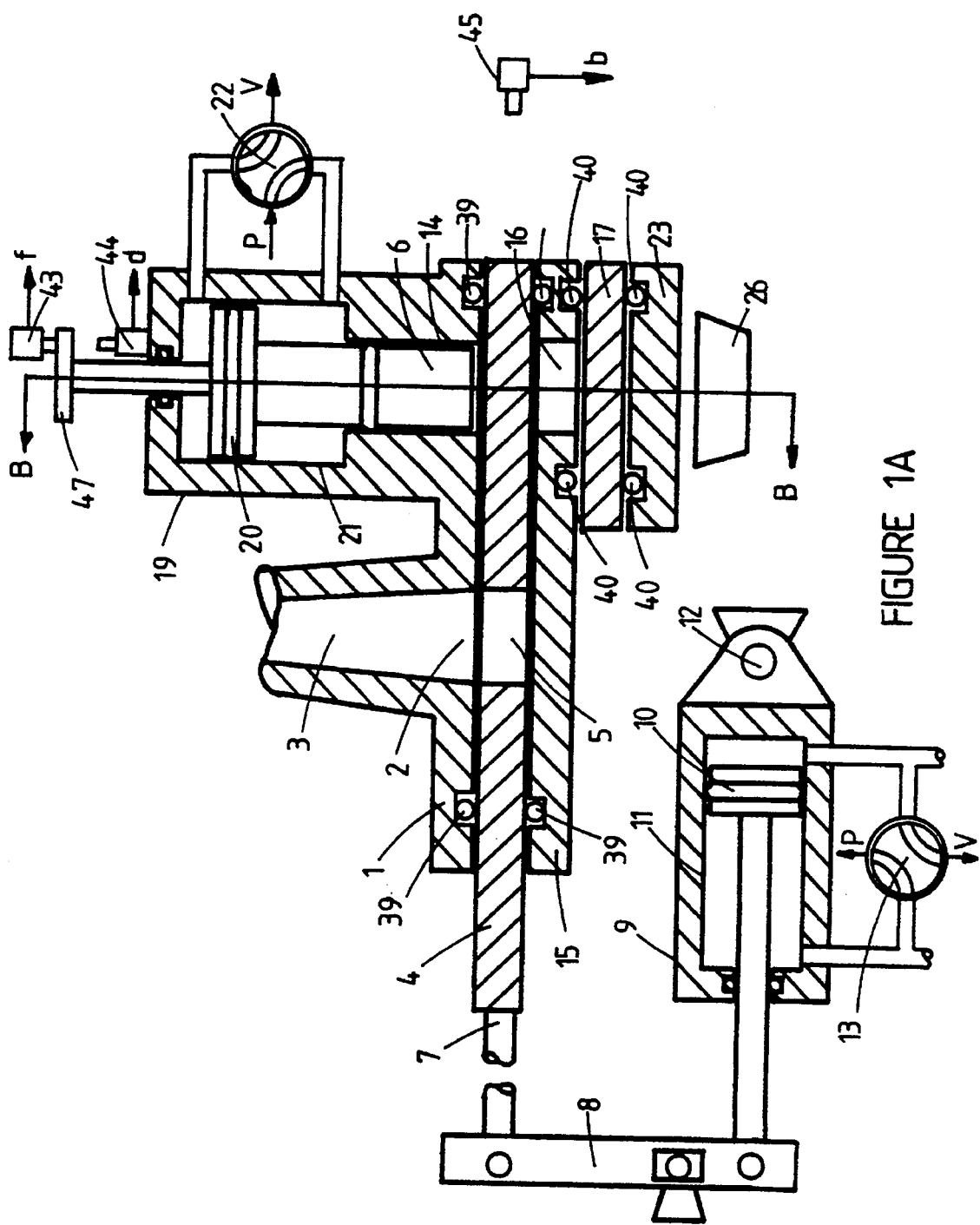
Figure 2A:
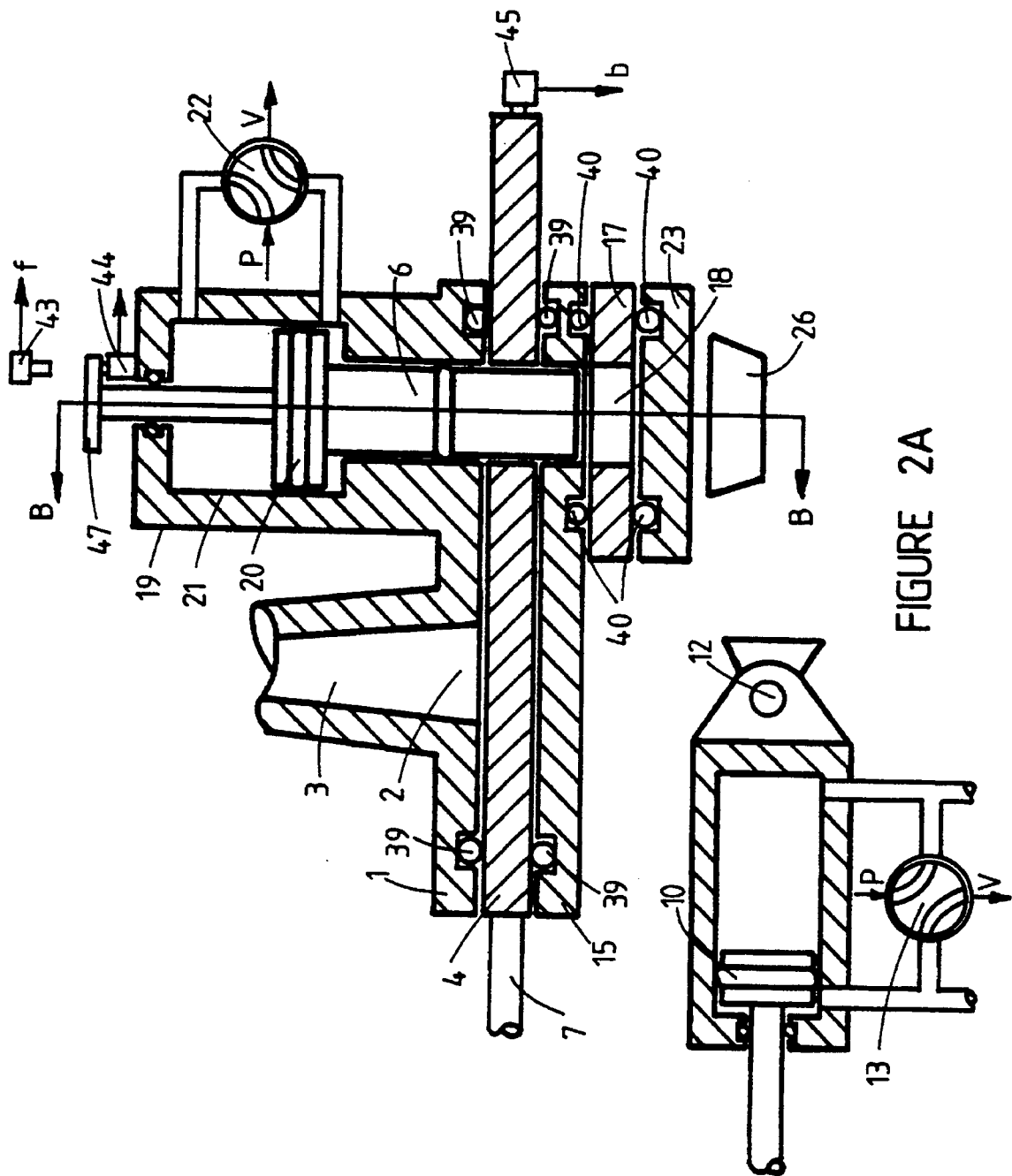

2. A moveable transfer plate, 4, comprises a transfer cavity, 5, which in FIG. 1A is aligned to the source port, 2, in order to receive solid chunks therefrom. The transfer cavity, 5, is shown in FIG. 2A aligned to the transfer driver piston, 6, and undergoing solids transfer.

3. The moveable transfer plate, 4, is driven to align the transfer cavity, 5, with the transfer driver piston, 6, and subsequently retracted back to align the transfer cavity, 5, with the source port, 2, via the drive bar, 7, linkage, 8, and transfer drive apparatus, 9, for moving the transfer plate, 4. This transfer drive apparatus, 9, comprises a piston, 10, operative sealably within a cylinder, 11, which is anchored at one end, 12. The piston, 10, acts via the linkage, 8, and drive bar, 7, to move the transfer plate, 4, when acted upon one side by high pneumatic or hydraulic pressure from a source, P, when the other side is vented to low pressure via vent, V. Pressure and vent are thusly applied alternately to opposite sides of the piston, 10, by the setting of the transfer plate control valve, 13, shown in FIG. 1A as set to align transfer cavity, 5, to source port, 2, and shown in FIG. 2A as set to align transfer cavity, 5, to transfer piston, 6.

4. The transfer driver piston, 6, operates sealably with a cylinder, 14, which is sealably secured to the source plate, 1.

5. A fixed traverse plate, 15, comprises a transfer port, 16, which is aligned with the transfer driver piston, 6.

Figure 1B:
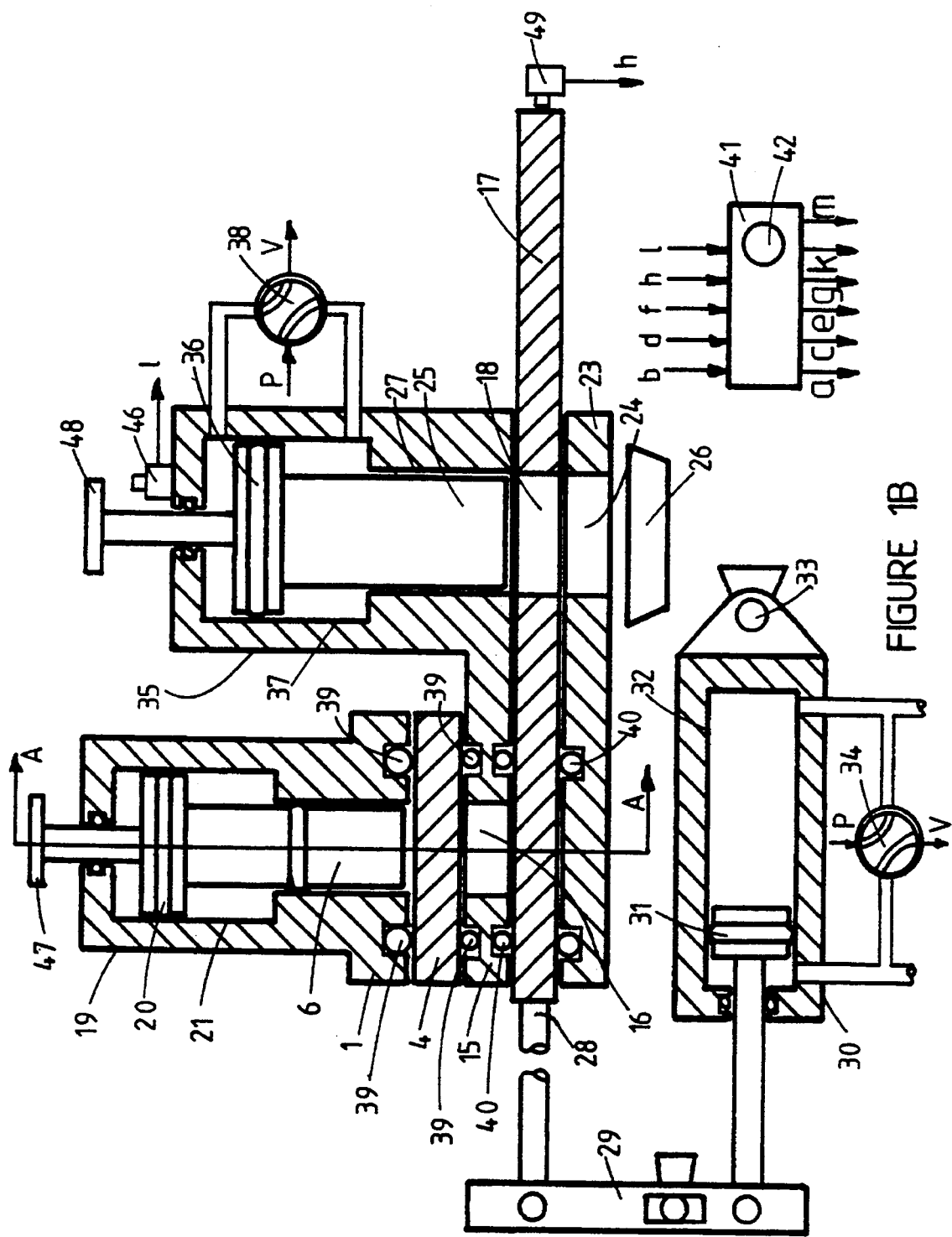

6. A moveable dump plate, 17, comprises a dump cavity, 18, which in FIG. 1B is aligned to the transfer port, 16, and hence to the transfer driver piston, 6, in order to receive solid chunks driven out of the transfer cavity, 5, and through the transfer port, 16, by the transfer driver piston, 6.

Figure 2B:
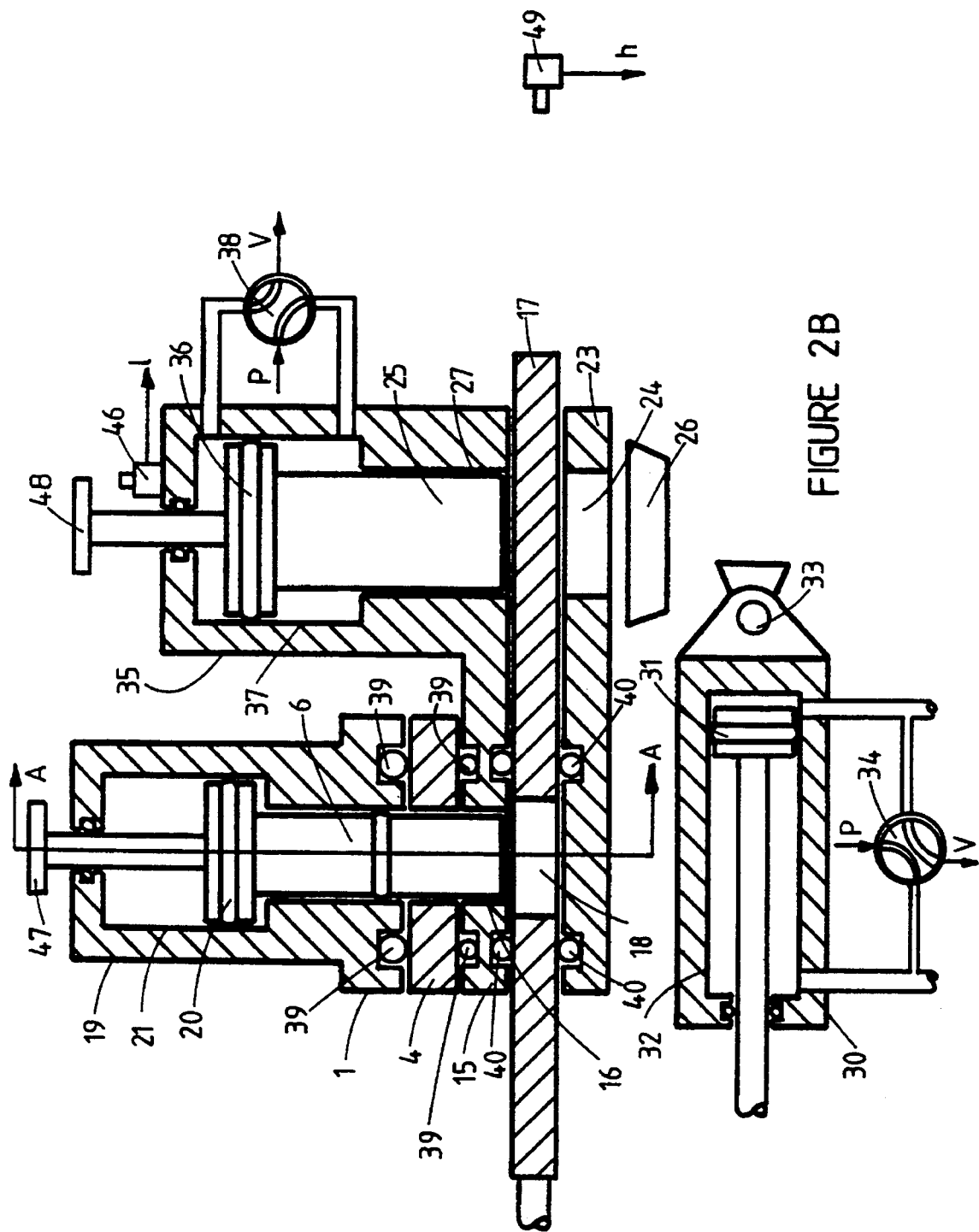

7. The transfer driver piston, 6, is driven to thus force solid chunks out of the transfer cavity, 5, and into the dump cavity, 18, by the transfer piston drive apparatus for driving and retracting, 19. This transfer piston drive apparatus, 19, comprises a piston, 20, operative sealably within a cylinder, 21, secured to the source plate, 1. The piston, 20, acts directly on the transfer driver piston, 6, to drive the transfer piston through the transfer cavity, 5, and the transfer port, 16, when pressure from source, P, acts upon the piston, 20, when the transfer piston control valve, 22 is set to connect to pressure, P, and vent, V, as shown in FIGS. 2A and 2B. The piston, 20, fully retracts the transfer driver piston, 6, out of the transfer port, 16, and transfer cavity, 5, when the transfer piston control valve, 22, is set to connect to pressure, P, and vent, V, as shown in FIGS. 1A, and 1B.

8. A fixed discharge plate, 23, comprises a dump port, 24, which is aligned with the dump driver piston, 25, and also with the solids receiver, 26.

9. The dump driver piston, 25, operates within the cylinder, 27, which is secured to the traverse plate, 15.

10. The moveable dump plate, 17, is driven to align the dump cavity, 18, with the transfer port, 16, as shown in FIG. 2B, and subsequently retracted back to align the dump cavity, 18, with the dump driver piston, 25, as shown in FIG. 1B, via the drive bar, 28, linkage, 29, and dump drive apparatus, 30, for moving the dump plate, 17. This dump drive apparatus, 30, is similar to the transfer drive apparatus, 9, and comprises a piston, 31, operative sealably within a cylinder, 32, which is anchored at one end, 33. The piston, 31, acts via the linkage, 29, and drive bar, 28, to move the dump plate, 17, and dump cavity, 18, into alignment with the transfer port, 16, when the dump plate control valve, 34, is set to connect pressure, P, and vent, V, as shown in FIG. 2B. The piston, 31, acts similarly to retract the dump plate, 17, and dump cavity, 18, into alignment with the dump port, 24, and dump piston, 25, when the dump plate control valve, 34, is set to connect pressure, P, and vent, V, as shown in FIG. 1B.

11. The dump driver piston, 25, is driven to force solid chunks out of the dump cavity, 18, and through the dump port 24, and into the solids receiver, 26, by the dump piston drive apparatus for driving and retracting, 35. This dump piston drive apparatus, 35, comprises a piston, 36, operative sealably within a cylinder, 37, secured to the traverse plate, 15. The dump piston drive apparatus, 35, is similar to the transfer piston drive apparatus, 19. The piston, 36, acts directly upon the dump driver piston, 25, to force solids out of the dump cavity, 18, and into the receiver, 26, when the dump piston control valve, 38, is set to connect pressure, P, and vent, V, at 90 degrees rotated from the position shown in FIG. 1B. The piston, 36, acts to retract the dump driver piston, 25, fully out of the dump port, 24, and dump cavity, 18, when the dump piston control valve, 38 is set to connect pressure, P, and vent, V, as shown in FIG. 2B.

12. The areas, as cross sectional areas, of the transfer cavity, 5, and the transfer port, 16, are sufficiently greater than the area of the transfer driver piston, 6, that mechanical interference and binding are avoided during transfer.

13. The volume of the dump cavity, 18, is greater than the volume of the transfer cavity, 5, so that the solid chunks transferred from the transfer cavity, 5, into the dump cavity, 18, do not fill up the dump cavity, 18. In this way sliding of the solid chunks across the upper sealing surfaces can be avoided.

14. The areas, as cross sectional areas, of the dump cavity, 18, and the dump port, 24, are sufficiently greater than the area of the dump driver piston, 25, that mechanical interference and binding are avoided during transfer.

15. The moveable transfer plate, 4, moves sealably between the fixed solid source plate, 1, and one side of the fixed traverse plate, 15, and these transfer plate seals 39, are positioned outside the area traversed by the transfer cavity, 5, during the full range of motion of the transfer plate, 4. In this way the solid chunks within the transfer cavity, 5, do not slide across the surface of these transfer plate seals 39, and wear and damage to these seals is thusly avoided.

16. The moveable dump plate, 17, moves sealably between the other side of the fixed traverse plate, 15, and the fixed discharge plate, 23, and these dump plate seals, 40, together with the transfer plate seals, 39, insure that the source port, 2, the transfer cavity, 5, and the transfer port, 16, are sealed against leakage to the outside whenever the dump cavity, 18, is aligned to the transfer port, 16, and also whenever the dump cavity is aligned to the dump port, 24. The solid chunks do not fill the dump cavity, 18, and thus need not slide across the surface of the upper dump plate seals and thus do not wear these seals. The solid chunks being loose within the dump cavity slide readily across the surface of the lower dump plate seals and inflict only minor wear or damage thereto. As will be described hereinafter, use of a hinged bottom on the dump cavity, 18, can prevent even this sliding of solid chunks across the surface of the lower dump plate seals.

17. A control device, 41, for controlling the four drive apparatus for driving, 9, 19, 30, 35, is responsive to an initiator, 42, for initiating the control device, 41, to carry out a single transfer and dump process for each initiation, and is operative upon the four control valves, 13, 22, 34, 38, which actuate the four drive apparatus, 9, 19, 30, 35, respectively. Each transfer and dump process comprises the following six steps occurring in sequence following initiation:

a. First, the transfer cavity, 5, is moved from alignment to the source port, 2, into alignment with the transfer driver piston, 6, and the dump cavity 18, is moved from alignment to the dump port, 24, into alignment with the transfer port, 16. These motions align the transfer cavity, the transfer port and the dump cavity to the transfer driver piston.

b. Second, the transfer driver piston, 6, moves through the transfer cavity, 5, and the transfer port, 16, thus transferring solid chunks out of the transfer cavity, 5, into the larger volume dump cavity, 18.

c. Third, the transfer driver piston, 6, is retracted fully out of the transfer port, 16, and the transfer cavity, 5.

d. Fourth, the transfer cavity, 5, is moved back into alignment with the source port, 2, and the dump cavity, 18, is moved back into alignment with the dump port, 24. These motions align the dump cavity and the dump port to the dump driver piston, 25.

e. Fifth, the dump driver piston, 25, moves through the dump cavity, 18, thus transferring solid chunks out of the dump cavity, 18, and into the dump receiver, 26, via the dump port, 24.

f. Sixth, the dump driver piston, 25, is retracted fully out of the dump cavity, 18.

In this way solid chunks are transferred sealably from the source port, 2, into the receiver, 26, each time the control device, 41, is initiated by the initiator, 42, and with minimum sliding of the solid chunks across the seals, and this is a principal beneficial object of this invention.

The control device, 41, can be any of several different types. For example, an electronic control device, with built in time delay intervals, could actuate the control valves, 13, 22, 34, 38, following initiation, by sending pulses, in a timed sequence, to solenoid actuators which move the control valves in the required sequence. These solenoid actuated control valves, 13, 22, 34, 38, could be of the type which move the valve when a brief electric pulse is applied, the valve being held in the new position as by a mechanical detent. The time delays between electric pulses are preset into the control device, 41, to allow for the time needed to carry out the motions of the plates and pistons.

The initiator, 42, for initiating each transfer and dump process can be a hand actuated switch or valve. In many applications, however, an automatic initiation will be preferred, initiation being accomplished by another, separate sensor and control device. For example, the burnout level sensor and control described in the U.S. patent application referred to under "Cross References To Related Applications", could carry out its intended control function by supplying the initiation pulse to the initiator, 42, of this invention.

As an alternative to use of built in time delay intervals, an electronic control device, 41, can be used, responsive to switches, 43, 44, 45, 46, 49, actuated by the dump plate, 17, the transfer plate 4, the switch bar, 47 secured sealably to the transfer driver piston, 6, and the switch bar, 48, secured sealably to the dump driver piston, 25. This electronic control device, responsive to plate and piston motions operates as follows:

a. Initiation by the initiator, 42, causes the controller, 41, to send a pulse, a, to the control valves, 13, and 34, which sets these valves as shown in FIG. 1B, and FIG. 2B. In consequence the transfer drive apparatus, 9, moves the transfer cavity, 5, into alignment with the transfer driver piston, 6, and the dump drive apparatus, 30, moves the dump cavity, 18, also into alignment with the transfer driver piston, 6,. This accomplishes the first step of the transfer and dump process.

b. This motion of the transfer plate, 4, actuates switch, 45, which sends signal b, to controller, 41, which sends a pulse, c, to the control valve, 22, which sets this valve as shown in FIG. 2A. In consequence the transfer driver piston, 6, moves through the transfer cavity, 5, and transfer port, 16, to transfer solid chunks into the dump cavity, 18. This accomplishes the second step of the transfer and dump process.

c. This motion of the transfer driver piston, 6, and connected switch bar, 47, actuates switch, 44, which sends signal, d, to controller, 41, which sends a pulse, e, to the control valve, 22, which sets this valve as shown in FIG. 1A. In consequence the transfer driver piston, 6, is fully retracted from the transfer port, 16 and the transfer cavity, 5. This accomplishes the third step of the transfer and dump process.

d. This motion of the transfer driver piston, 6, and connected switch bar, 47, actuates switch 43, which sends signal, f, to the controller, 41, which sends a pulse, g, to the control valves, 13, 34, which sets these valves as shown in FIG. 1A and FIG. 1B. In consequence the transfer drive apparatus, 9, moves the transfer cavity, 5, into alignment with the source port, 2, and the dump drive apparatus, 30, moves the dump cavity, 18, into alignment with the dump driver piston, 25. This accomplishes the fourth step of the transfer and dump process.

e. This motion of the dump plate, 17, actuates switch, 49, which sends signal, h, to controller, 41, which sends a pulse, k, to the control valve, 38, which sets this valve at 90 degrees rotated from the position shown in FIG. 1B. In consequence the dump driver piston, 25, moves through the dump cavity, 18, and dumps solid chunks into the receiver, 26, via the dump port, 24. This accomplishes the fifth step of the transfer and dump process.

f. This motion of the dump driver piston, 25, and connected switch bar, 48, actuates switch, 46, which sends signal, l, to controller, 41, which sends a pulse, m, to the control valve, 38, which sets this valve as shown in FIG. 1B. In consequence the dump driver piston, 25, is fully retracted from the dump cavity, 18. This accomplishes the sixth step of the transfer and dump process.

In this way a single transfer and dump process is carried out each time the initiator, 41, is initiated.

Pneumatic or hydraulic drive apparatus, 9, 19, 30, 35, are shown in the examples of FIGS. 1A, 1B, 2A, and 2B, but electrical or mechanical drive apparatus can alternatively be used.

The transfer plate, 4, and dump plate, 17, as shown in FIGS. 1A, 1B, 2A, and 2B, have linear motion, but rotational motions of these plates can alternatively be used in combination with rotational drive apparatus.

The transfer plate drive apparatus, 9, and the dump plate drive apparatus, 30 can be combined into a single drive apparatus if concurrent motion of the transfer plate, 4, and the dump plate, 17 is preferred.

In those applications where the solid chunks being transferred are loose and do not adhere to one another the dump driver piston, 25, and dump piston drive apparatus, 35, may be eliminated, since gravity alone may exert sufficient force to cause dumping of these loose solid chunks out of the dump cavity, 18, and into the receiver, 26, during the fifth step of the transfer and dump process.

Electrical and electronic control devices are shown in FIG. 1A, 1B, 2A, and 2B, and are described hereinabove. Alternatively other types of control devices, such as pneumatic control devices, can be used for the purposes of this invention.

The transfer plate can alternatively comprise two or more separate transfer cavities, and the dump plate can also comprise two or more separate dump cavities. By use of rotational motion of both the transfer plate, and the dump plate, additional transfer driver pistons, and additional dump driver pistons, may not be necessary. This multiple cavity form of this invention provides more rapid return of a transfer cavity to the source port. Such rapid return of a transfer cavity to the source port may be preferred where the source of solid chunks is the primary reactor of a cyclic char burning engine, running at high speed.

Figure 3:
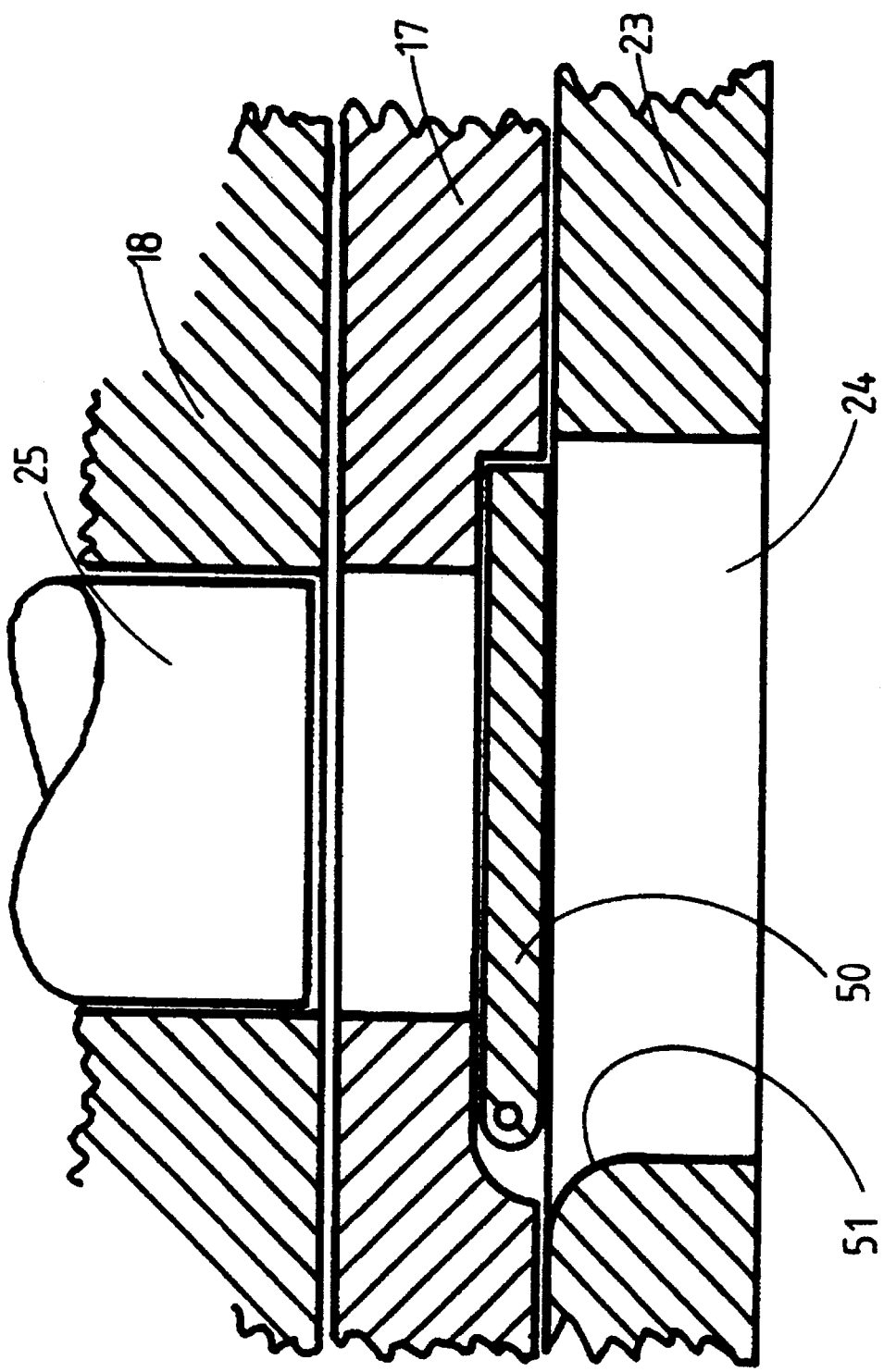

A modified form of the dump cavity, 18, is shown in FIG. 3 wherein a hinged bottom plate, 50, is fitted to the bottom of the dump cavity, 18. With this hinged bottom plate, 50, the solid chunks within the dump cavity, 18, do not slide over the seals between the dump plate, 17, and the discharge plate, 23, and wear of these seals is thusly prevented. The dump port, 24, is modified, as shown at, 51, to facilitate reclosure of the bottom plate, 50, to the dump cavity, 18, following dumping of the solid chunks and during subsequent motion of the dump plate into alignment with the transfer port, 16.

As shown in the example of FIGS. 1A, 1B, 2A, and 2B, the invention is used to transfer solids out of a high pressure reactor source, 3, and into a receiver, 26, at low or atmospheric pressure. A modified form of this invention can alternatively be used to transfer solids, from a source at low or atmospheric pressure, into a receiver or reactor at high pressure. This latter, refueling, form of this invention is similar to the above described, ash removal, form of this invention except as follows:

a. The receiver, 26, being a high pressure reactor, is fastened sealably to the discharge plate, 23;
  b. The dump driver piston, 25, operates sealably within its cylinder, 27, which is sealably fastened to the traverse plate, 15;
  c. Additional seals are used between the dump plate, 17, the discharge plate, 23 and the traverse plate, 15;
  d. The hinged bottom scheme, shown in FIG. 3, is not used when the receiver, as reactor is kept filled with solid chunks.
  e. Where a compressive force is desired to be applied to the solid chunks within the receiver, as reactor, the sixth step, retraction of the dump driver piston, following moving solid chunks out of the dump cavity and into the receiver, will be delayed, until after the next following initiation, and will precede the first step of aligning the dump cavity, as well as the transfer cavity, to the transfer driver piston. The sequence of steps of the transfer and dump process remains the same, but initiation occurs after step five and initiates step six of the sequence.
  f. The transfer driver piston seal and the source port seals are not necessary.

This refuel mechanism form of the solids transfer mechanisms of this invention, may be particularly useful on combined reactors for cyclic char burning engines, as described in the Cross Referenced U.S. patent application wherein abrasive ceramic chunks are premixed into the char fuel chunks.

Having thus described my invention what I claim is:

1. A solids transfer mechanism comprising:

a fixed source plate with a source port for solid chunks;

a moveable transfer plate with a transfer cavity;

a transfer driver piston operative sealably within a cylinder, said cylinder being sealably secured to said fixed source plate, said transfer driver piston area being slightly smaller than the area of said transfer cavity;

a transfer piston drive means for driving and retracting said transfer driver piston;

a fixed traverse plate with a transfer port, and said transfer port being aligned with said transfer driver piston, and having an area slightly larger than, the area of said transfer driver piston;

a moveable dump plate with a dump cavity, whose volume is greater than the volume of said transfer cavity, and whose area is preferably at least equal to the area of said transfer port;

a dump driver piston, operative within a cylinder and said cylinder being secured to said fixed traverse plate;

a fixed discharge plate with a dump port, and said dump port being aligned with said dump driver piston, and having an area slightly larger than, the area of said dump driver piston;

a dump receiver for receiving solid chunks dumped out of said dump cavity via said dump port;

said moveable transfer plate being positioned sealably between said fixed solids source plate and one side of said fixed traverse plate, said moveable dump plate being positioned between the other side of said fixed traverse plate and said fixed discharge plate;

a transfer drive means for moving said transfer plate back and forth between a position aligning said transfer cavity to said source port and another position aligning said transfer cavity to said transfer port;

a dump drive means for moving said dump plate back and forth between a position aligning said dump cavity to said transfer port and another position aligning said dump cavity to said dump port;

a dump piston drive means for driving and retracting said dump driver piston;

control means for controlling said several drive means and comprising an initiator means for initiating said control means and operative upon said transfer piston drive means for driving, said transfer drive means for moving, said dump drive means for moving, and said dump piston drive means for driving, so that a single transfer and dump process is carried out each time said control means is initiated by said initiator means;

said transfer and dump process comprising the sequence of steps of:

first, moving said transfer cavity from alignment to said source port for solid chunks into alignment with said transfer port, and moving said dump cavity from alignment to said dump port into alignment with said transfer port;

second, driving said transfer driver piston to move through said transfer cavity and said transfer port, thereby transferring solid chunks out of said transfer cavity and into said dump cavity;

third, retracting said transfer driver piston fully out of said transfer port and said transfer cavity;

fourth, returning said transfer cavity back into alignment with said source port for solid chunks and returning said dump cavity back into alignment with said dump port;

fifth, driving said dump driver piston to move through said dump cavity, thereby transferring solid chunks out of said dump cavity and into said dump receiver via said dump port;

sixth, retracting said dump driver piston fully out of said dump cavity;

sealing means for sealing said source plate and said source port for solid chunks, said transfer plate and said transfer cavity, said traverse plate and transfer port, and said dump plate and dump cavity so that:

said source port for solid chunks, said transfer cavity, said transfer port, are sealed from the outside whenever said dump cavity is aligned to said transfer port, and also whenever said dump cavity is aligned to said dump port;

that portion of said sealing means between said fixed source plate and said moveable transfer plate, and also between said moveable transfer plate and said fixed traverse plate, being positioned outside the area traversed by said transfer cavity during said transfer and dump process.

2. A solids transfer mechanism as described in claim 1:

wherein the area of said dump port exceeds the area of said dump cavity;

wherein said dump cavity further comprises a hinged bottom plate, hinged to said moveable dump plate, whose area exceeds the area of said dump cavity but is less than the area of said dump port.

3. A solids transfer mechanism comprising:

a fixed source plate with a source port for solid chunks;

a moveable transfer plate with at least two transfer cavities;

a transfer driver piston operative sealably within a cylinder, said cylinder being sealably secured to said fixed source plate, said driver transfer piston area being slightly smaller than the area of any one of said transfer cavities;

a transfer piston drive means for driving and retracting said transfer driver piston;

a fixed traverse plate with a transfer port, and said transfer port being aligned with said transfer driver piston, and having an area slightly larger than, the area of said transfer driver piston;

a moveable dump plate with at least two dump cavities, each said dump cavity having a volume greater than the volume of the largest transfer cavity, the area of each said dump cavity being preferably at least equal to the area of said transfer port;

a dump driver piston, operative within a cylinder and said cylinder being secured to said fixed traverse plate;

a fixed discharge plate with a dump port, and said dump port being aligned with said dump driver piston, and having an area slightly larger than, the area of said dump driver piston;

a dump receiver for receiving solid chunks dumped out of said dump cavity via said dump port;

said moveable transfer plate being positioned sealably between said fixed solids source plate and one side of said fixed traverse plate, said moveable dump plate being positioned between the other side of said fixed traverse plate and said fixed discharge plate;

a dump piston drive means for driving and retracting said dump driver piston;

drive means for rotationally driving said moveable transfer plate and said moveable dump plate, through a transfer and dump process for transferring solid chunks from said source port for solid chunks to said dump receiver;

control means for controlling said several drive means and comprising an initiator means for initiating said control means and operative upon said drive means for rotationally driving said moveable transfer plate and said moveable dump plate, said transfer piston drive means for driving and retracting, and said dump piston drive means for driving and retracting, so that a single transfer and dump process is carried out each time said control means is initiated by said initiator means;

said transfer and dump process comprising the sequence of steps of:

first, moving one transfer cavity from alignment to said source port for solid chunks into alignment with said transfer port and moving one dump cavity from alignment to said dump port into alignment with said transfer port;

second, aligning another transfer cavity with said source port for solid chunks, and aligning another dump cavity with said dump port;

third, driving said transfer driver piston to move through said aligned transfer cavity and said transfer port in order to transfer solid chunks out of said transfer cavity aligned hereto and into said dump cavity aligned thereto;

fourth, retracing said transfer driver piston fully out of said transfer port and said transfer cavity aligned thereto;

fifth, driving said dump driver piston to move through said another dump cavity aligned thereto in order to transfer solid chunks out of said another dump cavity aligned thereto and into said dump receiver via said dump port;

sixth, retracting said dump driver piston fully out of said another dump cavity aligned thereto;

sealing means for sealing said source plate and said source port for solid chunks, said transfer plate and said transfer cavities aligned to said source port and said transfer port, said traverse plate and transfer port, said dump plate and said dump cavity aligned to said transfer port, so that these plates ports and cavities are sealed from the outside;

that portion of said sealing means between said fixed source plate and said moveable transfer plate, and also between said moveable transfer plate and said fixed traverse plate, being positioned outside the area traversed by that transfer cavity undergoing a transfer and dump process.

4. A solids transfer mechanism as described in claim 3:

wherein the area of said dump port exceeds the area of any one of said dump cavities;

wherein each said dump cavity further comprises a hinged bottom plate, hinged to said moveable dump plate, whose area exceeds the area of said dump cavity, and whose area is less than the area of said dump port.

5. A solids transfer mechanism comprising:

a fixed source plate with a source port for solid chunks;

a moveable transfer plate with a transfer cavity;

a transfer driver piston operative within a cylinder, said cylinder being secured to said fixed source plate, said transfer driver piston area being slightly smaller than the area of said transfer cavity;

a transfer piston drive means for driving and retracting said transfer driver piston;

a fixed traverse plate with a transfer port, and said transfer port being aligned with said transfer driver piston, and having an area slightly larger than, the area of said transfer driver piston;

a moveable dump plate with a dump cavity, whose volume is greater than the volume of said transfer cavity, and whose area is preferably at least equal to the area of said transfer port;

a dump driver piston, operative sealably within a cylinder and said cylinder being sealably secured to said fixed traverse plate;

a fixed discharge plate with a dump port, and said dump port being aligned with said dump driver piston, and having an area slightly larger than, the area of said dump driver piston;

a dump receiver for receiving solid chunks dumped out of said dump cavity via said dump port, said dump receiver being sealably secured to said fixed discharge plate;

said moveable transfer plate being positioned between said fixed solid source plate and one side of said fixed traverse plate;

said moveable dump plate being positioned sealably between the other side of said fixed traverse plate and said fixed discharge plate;

a transfer drive means for moving said transfer plate back and forth between a position aligning said transfer cavity to said source port and another position aligning said transfer cavity to said transfer port;

a dump drive means for moving said dump plate back and forth between a position aligning said dump cavity to said transfer port and another position aligning said dump cavity to said dump port;

a dump piston drive means for driving and retracting said dump driver piston;

control means for controlling said several drive means and comprising an initiator means for initiating said control means and operative upon said transfer piston drive means for driving, said transfer drive means for moving, said dump drive means for moving, and said dump piston drive means for driving, so that a single transfer and dump process is carried out each time said control means is initiated by said initiator means;

said transfer and dump process comprising the sequence of steps of:

first, retracting said dump driver piston fully out of said dump cavity;

second, moving said transfer cavity from alignment to said source port for solid chunks into alignment with said transfer port, and moving said dump cavity from alignment to said dump port into alignment with said transfer port;

third, driving said transfer driver piston to move through said transfer cavity and said transfer port, thereby transferring solid chunks out of said transfer cavity and into said dump cavity;

fourth, retracting said transfer driver piston fully out of said transfer port and said transfer cavity;

fifth, returning said transfer cavity back into alignment with said source port for solid chunks and returning said dump cavity back into alignment with said dump port;

sixth, driving said dump driver piston to move through said dump cavity, thereby transferring solid chunks out of said dump cavity and into said dump receiver via said dump port;

sealing means for sealing said dump plate and dump cavity, said discharge plate and dump port, and said traverse plate, so that said receiver and said dump port are sealed from the outside whenever said dump cavity is aligned to said dump port and also whenever said dump cavity is aligned to said transfer port.

6. A solids transfer mechanism comprising:

a fixed source plate with a source port for solid chunks;

a moveable transfer plate with at least two transfer cavities;

a transfer driver piston operative within a cylinder, said cylinder being secured to said fixed source plate;

said driver transfer piston area being slightly smaller than the area of any one of said transfer cavities;

a transfer piston drive means for driving and retracting said transfer driver piston;

a fixed traverse plate with a transfer port, and said transfer port being aligned with said transfer driver piston, and having an area slightly larger than, the area of said transfer driver piston;

a moveable dump plate with at least two dump cavities, each said dump cavity having a volume greater than the volume of the largest transfer cavity, the area of each said dump cavity being preferable at least equal to the area of said transfer port;

a dump driver piston, operative sealably within a cylinder and said cylinder being sealably secured to said fixed transverse plate;

a fixed discharge plate with a dump port, and said dump port being aligned with said dump driver piston, and having an area slightly larger than, the area of said dump driver piston;

a dump receiver for receiving solid chunks dumped out of said dump cavity via said dump port, said dump receiver being sealably secured to said fixed discharge plate;

said moveable transfer plate being positioned between said fixed solid source plate and one side of said fixed transverse plate;

said moveable dump plate being positioned sealably between the other side of said fixed traverse plate and said fixed discharge plate;

a dump piston drive means for driving and retracting said dump driver piston;

drive means for rotationally driving said moveable transfer plate and said moveable dump plate, through a transfer and dump process for transferring solid chunks from said source port for solid chunks to said dump receiver;

control means for controlling said several drive means and comprising an initiator means for initiating said control means and operative upon said drive means for rotationally driving said moveable transfer plate and said moveable dump plate, said transfer piston drive means for driving and retracting, and said dump piston drive means for driving and retracting, so that a single transfer and dump process is carried out each time said control means is initiated by said initiator means;

said transfer and dump process comprising the sequence of steps of:

first retracting said dump driver piston fully out of said another dump cavity aligned thereto;

second, moving one transfer cavity from alignment to said source port for solid chunks into alignment with said transfer port and moving one dump cavity from alignment to said dump port into alignment with said transfer port;

third, aligning another transfer cavity with said source port for solid chunks, and aligning another dump cavity with said dump port.

fourth, driving said transfer driver piston to move through said aligned transfer cavity and said transfer port in order to transfer solid chunks out of said transfer cavity aligned thereto and into said dump cavity aligned thereto;

fifth, retracting said transfer driver piston fully out of said transfer port and said transfer cavity aligned thereto;

sixth, driving said dump driver piston to move through said another dump cavity aligned thereto in order to transfer solid chunks out of said another dump cavity aligned thereto and into said dump receiver via said dump port;

sealing means for sealing said dump plate and dump cavities, said discharge plate and dump port, and said transverse plate, so that said receiver and said dump port are sealed from the outside whenever a dump cavity is aligned to said dump port.

7. A solids transfer mechanism comprising:

a fixed source plate with a source port for solid chunks;

a moveable transfer plate with a transfer cavity;

a transfer driver piston operative sealably within a cylinder, said cylinder being sealably secured to said fixed source plate, said transfer driver piston area being slightly smaller than the area of said transfer cavity;

a transfer piston drive means for driving and retracting said transfer driver piston;

a fixed transverse plate with a transfer port, and said transfer port being aligned with said transfer driver piston, and having an area slightly larger than, the area of said transfer driver piston;

dump plate with a dump cavity, whose volume is greater than the volume of said transfer cavity, and whose area is preferably at least equal to the area of said transfer port;

a dump receiver for receiving solid chunks dumped out of said dump cavity via said dump port;

a fixed discharge plate with a dump port, and said dump port being aligned with said dump receiver;

said moveable transfer plate being positioned sealably between said fixed solids source plate and one side of said fixed transverse plate, said moveable dump plate being positioned between the other side of said fixed traverse plate and said fixed discharge plate;

a transfer drive means for moving said transfer plate back and forth between a position aligning said transfer cavity to said source port and another position aligning said transfer cavity to said transfer port;

a dump drive means for moving said dump plate back and forth between a position aligning said dump cavity to said transfer port and another position aligning said dump cavity to said dump port;

control means for controlling said several drive means and comprising an initiator means for initiating said control means and operative upon said transfer piston drive means for driving, said transfer drive means for moving, and said dump drive means for moving, so that a single transfer and dump process is carried out each time said control means is initiated by said initiator means;

said transfer and dump process comprising the sequence of steps of:

first, moving said transfer cavity from alignment to said source port for solid chunks into alignment with said transfer port, and moving said dump cavity from alignment to said dump port into alignment with said transfer port;

second, driving said transfer driver piston to move through said transfer cavity and said transfer port, thereby transferring solid chunks out of said transfer cavity and into said dump cavity;

third, retracting said transfer driver piston fully out of said transfer port and said transfer cavity;

fourth, returning said transfer cavity back into alignment with said source port for solid chunks and returning said dump cavity back into alignment with said dump port;

sealing means for sealing said source plate and said source port for solid chunks, said transfer plate and said transfer cavity, said traverse plate and transfer port, and said dump plate and dump cavity so that:

said source port for solid chunks, said transfer cavity, said transfer port, are sealed from the outside whenever said dump cavity is aligned to said transfer port, and also whenever said dump cavity is aligned to said dump port;

that portion of said sealing means between said fixed source plate and said moveable transfer plate, and also between said moveable transfer plate and said fixed traverse plate, being positioned outside the area traversed by said transfer cavity during said transfer and dump process.

8. A solids transfer mechanism comprising:

a fixed source plate with a source port for solid chunks;

a moveable transfer plate with at least two transfer cavities;

a transfer driver piston operative sealably within a cylinder, said cylinder being sealably secured to said fixed source plate;

said driver transfer piston area being slightly smaller than the area of any one of said transfer cavities;

a transfer piston drive means for driving and retracting said transfer driver piston;

a fixed traverse plate with a transfer port, and said transfer port being aligned with said transfer driver piston, and having an area slightly larger than, the area of said transfer driver piston;

a moveable dump plate with at least two dump cavities, each said dump cavity having a volume greater than the volume of the largest transfer cavity, the area of each said dump cavity being preferably at least equal to the area of said transfer port;

a fixed discharge plate with a dump port, and said dump port being aligned with said dump receiver;

a dump receiver for receiving solid chunks dumped out of said dump cavity via said dump port;

said moveable transfer plate being positioned sealably between said fixed solids source plate and one side of said fixed traverse plate, said moveable dump plate being positioned between the other side of said fixed traverse plate and said fixed discharge plate;

drive means for rotationally driving said moveable transfer plate and said moveable dump plate through a transfer and dump process for transferring solid chunks from said source port for solid chunks to said dump receiver;

control means for controlling said several drive means and comprising an initiator means for initiating said control means and operative upon said drive means for rotationally driving said moveable transfer plate and said moveable dump plate, and for linearly driving said transfer driver piston, so that a single transfer and dump process is carried out each time said control means is initiated by said initiator means;

said transfer and dump process comprising the sequence of steps of:

first, moving one transfer cavity from alignment to said source port for solid chunks into alignment with said transfer port and moving one dump cavity from alignment to said dump port into alignment with said transfer port;

second, aligning another transfer cavity with said source port for solid chunks and aligning another dump cavity with said dump port;

third, driving said transfer driver piston to move though said aligned transfer cavity and said transfer port in order to transfer solid chunks out of said transfer cavity aligned thereto and into said dump cavity aligned thereto;

fourth, retracting said transfer driver piston fully out of said transfer port and said transfer cavity aligned thereto;

sealing means for sealing said source plate and said source port for solid chunks, said transfer plate and said transfer cavities aligned to said source port and said transfer port, said traverse plate and transfer port, said dump plate and said dump cavity aligned to said transfer port, so that these plates ports and cavities are sealed from the outside;

that portion of said sealing means between said fixed source plate and said moveable transfer plate, and also between said moveable transfer plate and said fixed traverse plate, being positioned outside the area traversed by that transfer cavity undergoing a transfer and dump process.

* * * * *